Oct. 30, 1962   E. J. BENOIT   3,061,371
CHILD'S AUTO SAFETY SEAT
Filed May 17, 1962   2 Sheets-Sheet 1

INVENTOR
Edward J. BENOIT
BY Pierre Lespérance
PATENT AGENT

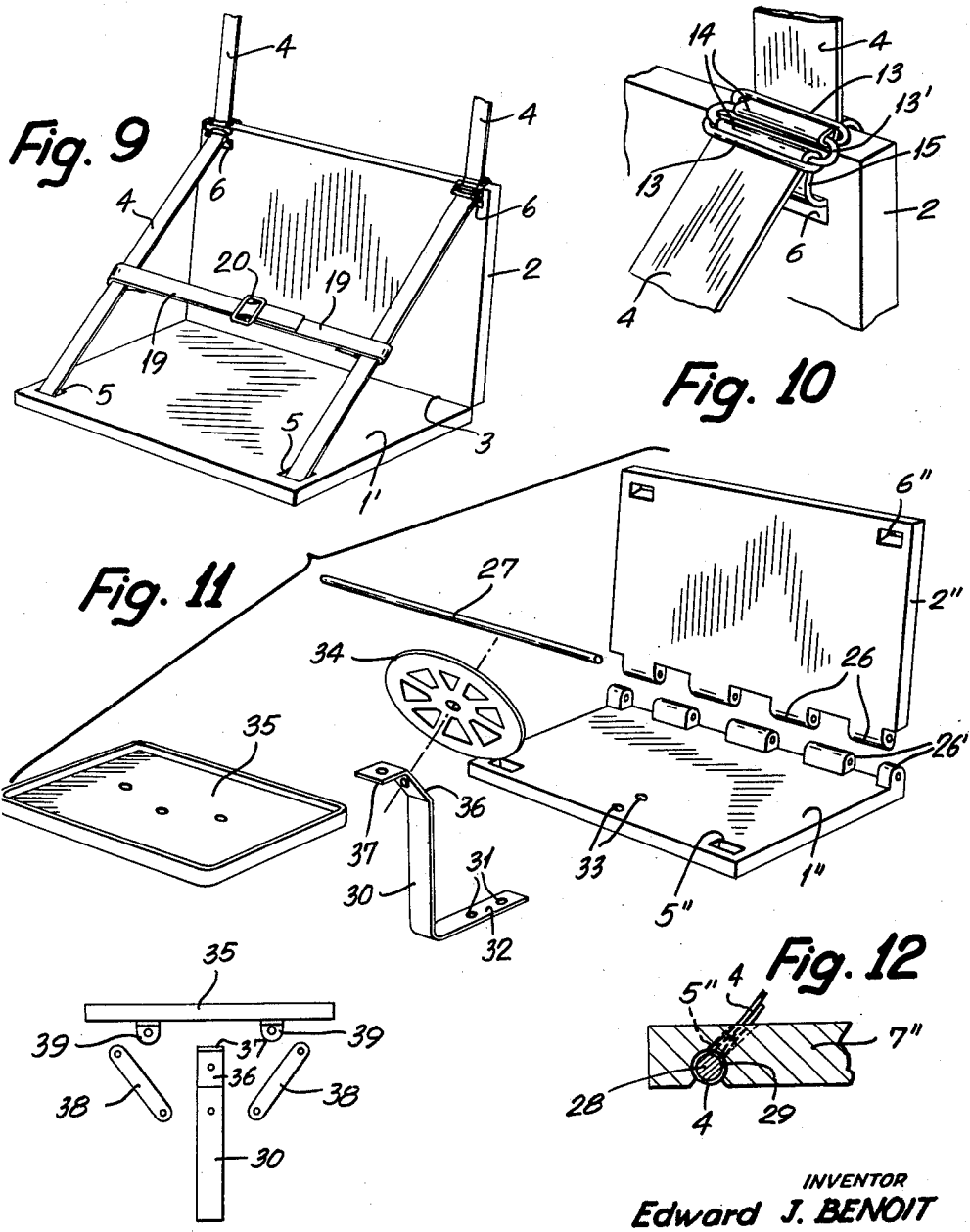

United States Patent Office 3,061,371
Patented Oct. 30, 1962

3,061,371
CHILD'S AUTO SAFETY SEAT
Edward J. Benoit, 28 Guerin St., Boucherville,
Quebec, Canada
Filed May 17, 1962, Ser. No. 195,574
5 Claims. (Cl. 297—256)

The present invention relates to an automobile accessory and more particularly to a child's safety seat for use in an automobile.

The principal object of the present invention resides in the provision of a child's auto seat which affords the maximum degree of safety with an equal amount of comfort to the child seated therein, and which will prevent the child from being thrown from the seat in the event of sudden stopping or when the automobile rides over bumps in the road.

Another important object of the present invention resides in the provision of a child's auto seat of the character described which will remain firmly attached in position on the automobile front seat despite violent jarring and even when the child is three or four years old and weighs thirty pounds or more.

Another object of the present invention resides in the provision of an auto seat of the character described in which both the inclination of the bottom of the seat and the height of the entire seat are adjustable so as to provide maximum comfort for the child, as well as an obstructed view of the surrounding country.

Another object of the present invention resides in the provision of improved means for adjusting the height and inclination of the seat, said means being easy of adjustment and yet being self-locking under load.

Yet another object of the present invention resides in the provision of a child's auto seat of the character described which is quick folding for easy stowing.

Another object of the invention resides in the seat of the character described of means to mount accessories to add to the child's pleasure.

The foregoing and other important objects of the present invention will become more apparent during the following disclosure and by referring to the drawings in which:

FIGURE 9 is a perspective view of the seat assembly in which the bottom and back are united by straps;

FIGURE 10 is a partial perspective view on an enlarged scale of the strap connection to the top corner of the seat back;

FIGURE 11 is an exploded perspective view of another embodiment of the seat made of plastic material and also showing accessories adapted to be secured to the seat bottom;

FIGURE 12 is a cross-section of an outer corner of the seat bottom showing the means for attaching the strap to said bottom; and FIGURE 13 is an exploded front elevation of the table accessory.

Figure 1:
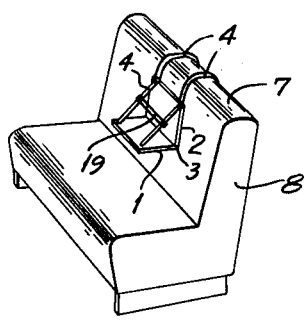
FIGURE 1 is a perspective view of an automobile front seat provided with the child's seat in accordance with the invention.
Figure 2:
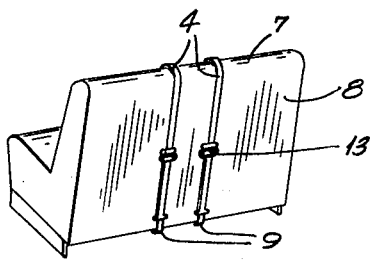
FIGURE 2 is a rear perspective view of the automobile front seat and showing the means for suspending the child's seat.
Figure 6:
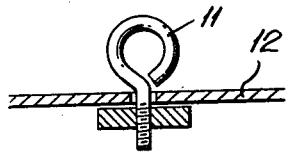
FIGURE 6 is a partial cross-section of the automobile floor with an anchor eyebolt secured thereto.

Referring now more particularly to the drawings in which like reference characters indicate like elements throughout, the seat of the present invention comprises a bottom panel 1 and a back panel 2 which are hinged together at their meeting edges as indicated at 3 so that they may be folded one against the other to be stored away.

Figure 5:
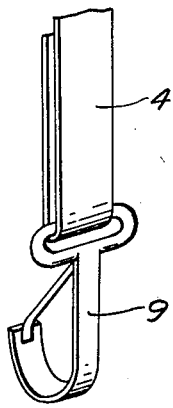
FIGURE 5 is a perspective view of the hook at the lower end of the straps of FIGURE 3.

A pair of flexible straps 4 made of leather, flexible plastic, cotton webbing, and the like, are inserted through holes 5 made in the outer corners of the bottom panel 1 and secured to said bottom panel at one end, as shown in FIGURE 9, and are adjustably connected to the top corners of the back panel 2 by passing through holes 6 made in said top corners, as shown more clearly in FIGURE 10. The straps then pass over the curved top 7 of the back 8 of an automobile front seat. The straps 4 each form a loop at their free end through which is attached a conventional spring lock hook 9, shown in FIGURE 5. The hook 9 is attached either to the conventional cross bar 10 at the lower edge of the back face of the automobile seat back 8 or, if this is not convenient, to two eyebolts 11 which may be secured to the floor 12 of the automobile just behind the back of the front seat. Thus the child's seat is maintained over the front face of the back of the automobile seat by means of the straps 4, which being provided with hooks 9 cannot possibly become detached. This arrangement is much safer than child's seats provided with rigid hook shaped members engaging the top of the automobile seat back, and which may become disengaged if the car rides over a bump or which may unbend under the child's weight.

Figures 3, 4:
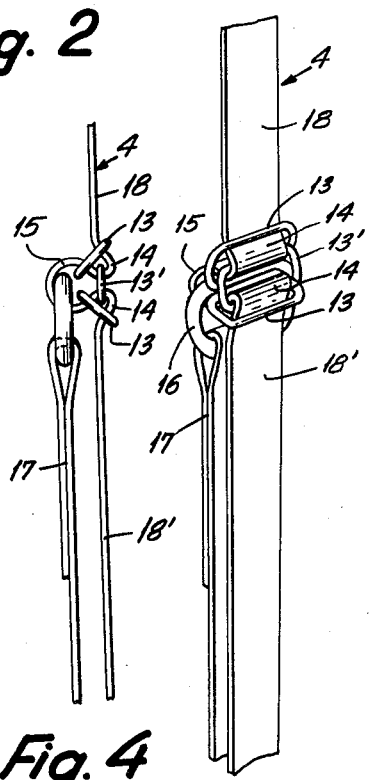
FIGURE 3 is a perspective view of the straps and lock rings assembly serving to anchor the child's seat and to adjust the height of the seat.
FIGURE 4 is a side elevation of the elements of FIGURE 3.

The level of the seat may be adjusted by means of the lock-ring assembly, shown in FIGURES 3 and 4. This adjustable locking attachment comprises three identical lock-rings 13, 13' made of metal and of elongated shape. The strap 4 is folded to form two secondary loops 14 inserted through the two outer lock rings 13 and interconnected by the intermediate lock ring 13' which passes through said loops 14. The strand of the strap common to the two secondary loops 14 forms a main loop 15 which passes through a metal ring 16 attached to the outer folded end 17 of the strap. When the two strap strands 18, 18' are pulled apart, the two secondary loops 14 are prevented from disengaging the outer lock-rings 13 due to the presence of the intermediate or center lock-ring 13' and positively lock the main loop 15 in its intended position along the strap. Thus, the length of the strap is positively locked in adjusted position. To re-adjust the length of the strap, it is very simple to release the tension and enlarge the secondary loops 14 and slide the strap through the lock rings.

An identical adjustable locking attachment is provided at the top corner of the back panel 2 of the child's seat, as shown in FIGURE 10. In this case, the main loop 15 passes through the hole 6 and surrounds the marginal portion of the seat back between the hole and the top edge thereof. With this attachment, shown in FIGURE 10, it is very easy to adjust the effective length of the strap portion extending between the outer corners of the seat bottom and back panel to thereby adjust the inclination of the bottom panel 1 to suit the child.

As shown in FIGURE 9, two transverse strap portions 19, one provided with a buckle 20, are attached to the middle of the sections of the straps 4 interconnecting the outer corners of the seat panels 1 and 2. This transverse strap 19 serves to keep the child on the seat.

The panels 1 and 2 may be made of wood, rigid plastic material, sheet metal, or other suitable material. The panels may also consist of tubular frames with fabric web.

Figure 7:
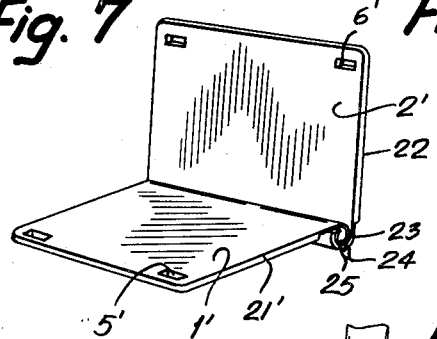
FIGURE 7 is a perspective view of the back and bottom of the seat made of sheet metal.
Figure 8:
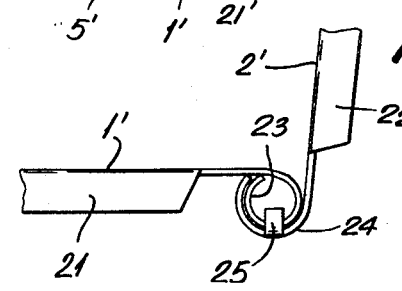
FIGURE 8 is a partial side elevation of the embodiment of FIGURE 7 showing the hinged connection.

When made of sheet metal, as illustrated in FIGURES 7 and 8, the panels 1' and 2' have corner holes 5' and 6' respectively and are preferably provided with a marginal reinforcing flange 21 and 22 respectively, and the hinge between said two panels is preferably made of integral rolled sections, namely, male hinge section 23 integrally depending from the bottom panel 1' and female section 24 integrally depending from the back panel 2'. These two hinged sections 23 and 24 are slidably fitted within each other, and tabs 25, integral with the ends of the female hinge section 24 are bent back over the male hinge section 23 to prevent sliding out of said latter section. The rear face of back panel 2' is preferably lined with fabric material or with a form of pressed-wood to avoid damaging the back 8 of the auto seat.

In the case of seat panels 1" and 2" made of rigid plastic material, as shown in FIGURE 11, the hinge elements may be integrally molded with the panels, as shown at 26 and 26', the hinge section 26' protruding at right angles from the bottom panel 1"; the two hinged sections 26, 26' interfit each other and are bored to receive a hinge pin 27.

The front end of each strap 4 may be attached to the outer corner of the bottom panel 1 in any desired manner; for example, the strap passes through hole 5 to be attached by a pin or the like passing through the looped end of the strap and extending underneath the panel. In the case of a plastic bottom panel 1", the looped end of the strap passes through inclined hole 5" and is looped around a retaining pin 28 which is press fitted within a cavity 29 having a mouth slightly smaller than the diameter of the pin 28 and surrounding strap. The outer corners of panel 2" have holes 6" for the adjustable locking attachment of straps 4 as in the previous embodiments.

If desired, the seat may be provided with accessories, as shown in FIGURES 11 and 13, to keep the child occupied. For instance, an L-shaped bracket 30 may be secured by bolts passing through holes 31 made in the horizontal leg 32 of the bracket 30 and holes 33 made in the front central portion of the bottom panel. The top of the bracket may be fitted either with an inclined wheel 34 or with a table 35. Wheel 34 will be removably pivoted on a stud shaft secured within a hole made in inclined portion 36 of the bracket, while table 35 may be removably secured to the top horizontal portion 37 of the bracket 30 and reinforced by braces 38 secured to the bracket 30 and to L-shaped lugs 39 fixed underneath seat table 35.

While preferred embodiments in accordance with the present invention have been illustrated and described, it is understood that various modifications may be resorted to without departing from the spirit and scope of the appended claims.

What is claimed is:

1. An auxiliary seat for children adapted to be fitted and held upon the back of a passenger front seat of an automobile, and the like, comprising bottom and back seat members, hinged together at their inner edges, a pair of flexible straps attached at one end to the outer corners of said bottom seat member and adjustably attached intermediate their ends to the outer corners of the back seat member, said straps being looped at their other end portion and having a length to extend over the top of the automobile seat back and downwardly below the back face of said automobile seat back, and hooks slidably attached to said looped end portions of said strap members for removably attaching said straps to a fixed point below said automobile seat back in order to suspend said auxiliary seat onto the front face of said automobile seat back, adjustable locking attachment means between said outer corners of said back seat member and said straps to vary the effective length of the portion of said straps extending between the outer corners of said seat members, and additional adjustable locking attachment means for adjustably locking the effective length of the looped portion of said straps to adjustably vary the height of said auxiliary seat with respect to said automobile seat.

2. An auxiliary seat as claimed in claim 1, wherein said adjustable locking attachment means of each said strap to the outer corner of the back member of said auxiliary seat comprises a pair of outer lock-rings and an intermediate lock-ring disposed side by side, said straps being folded at two spaced zones to form secondary loops inserted through the outer lock-rings, the intermediate lock-ring passing through said secondary loops and attaching the same, the portion of the strap common to said two secondary loops forming a main loop passing through a hole made in the said outer corner of said back member and surrounding the marginal portion defined between said hole and the top outer edge of said back member.

3. An accessory seat as claimed in claim 2, wherein said additional adjustable locking attachment means include a pair of outer lock-rings, and an intermediate lock-ring, said straps having a portion folded to form two secondary loops inserted through said outer lock-ring, said intermediate lock-ring passing through and interconnecting said secondary loops, the portion of said strap common to said secondary loops being folded and forming a main loop, the end of the looped portion of said strap being slidably attached to said main loop.

4. An accessory seat as claimed in claim 1, wherein said seat members consist of sheet metal panels each having an integral rolled section along its inner edge, said rolled sections slidably fitted one within the other and forming a hinged connection for said seat members.

5. An accessory seat as claimed in claim 1, wherein said seat members consist of rigid plastic panels, each having at its inner edge integral hinge members interengaging between the hinged members of the other panel, one set of hinged members protruding at right angles from the face of the associated panel.

References Cited in the file of this patent

UNITED STATES PATENTS

| | | |
|---|---|---|
| 936,685 | Wallace | Oct. 12, 1909 |
| 1,140,730 | Wolfert | May 25, 1915 |
| 2,825,391 | Underhill | Mar. 4, 1958 |
| 2,990,007 | Kessler | June 27, 1961 |

FOREIGN PATENTS

| | | |
|---|---|---|
| 7,046 | Great Britain | 1911 |
| 876,586 | Germany | May 15, 1953 |